(12) United States Patent
Marsico (10) Patent No.: US 9,071,512 B2
(45) Date of Patent: Jun. 30, 2015

(54) METHODS, SYSTEMS, AND COMPUTER READABLE MEDIA FOR DISTRIBUTING DIAMETER NETWORK MANAGEMENT INFORMATION

(75) Inventor: Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 963 days.

(21) Appl. No.: 13/197,566

(22) Filed: Aug. 3, 2011

(65) Prior Publication Data

US 2012/0036246 A1 Feb. 9, 2012

Related U.S. Application Data

(60) Provisional application No. 61/371,418, filed on Aug. 6, 2010.

(51) Int. Cl.
*G06F 15/173* (2006.01)
*H04L 12/24* (2006.01)
*H04L 29/06* (2006.01)

(52) U.S. Cl.
CPC ......... *H04L 41/0654* (2013.01); *H04L 63/0892* (2013.01)

(58) Field of Classification Search
CPC .. H04L 65/1016; H04W 24/08; H04W 24/00; H04M 2215/208; H04M 3/42374
See application file for complete search history.

(56) References Cited

U.S. PATENT DOCUMENTS

| | | | |
|---|---|---|---|
| 5,719,861 A | 2/1998 | Okanoue | |
| 6,105,034 A | 8/2000 | Buckler | |
| 6,366,577 B1 | 4/2002 | Donovan | |
| 6,385,198 B1 | 5/2002 | Ofek et al. | |
| 6,404,746 B1 | 6/2002 | Cave et al. | |
| 6,735,291 B1 | 5/2004 | Schmid et al. | |
| 7,308,499 B2 | 12/2007 | Chavez | |
| 7,742,421 B2 | 6/2010 | Bantukul et al. | |

(Continued)

FOREIGN PATENT DOCUMENTS

| CN | 1700694 A | 11/2005 |
|---|---|---|
| CN | 101151861 A | 3/2008 |

(Continued)

OTHER PUBLICATIONS

Notice of Allowance for U.S. Appl. No. 11/510,284 (Dec. 9, 2010).

(Continued)

*Primary Examiner* — Peling Shaw
(74) *Attorney, Agent, or Firm* — Jenkins, Wilson, Taylor & Hunt, P.A.

(57) ABSTRACT

Methods, systems, and computer readable media for distributing Diameter network management information are disclosed. According to one method, a first Diameter node obtains Diameter network management subscription information. The first Diameter node obtains Diameter network management information. The first Diameter node determines, using the Diameter network management subscription information, whether at least one second Diameter node is subscribed to receive the obtained Diameter network management information. In response to determining that the at least one second Diameter node is subscribed to receive the obtained network management information, the first Diameter node sends the obtained Diameter network management information to the at least one second Diameter node.

18 Claims, 12 Drawing Sheets

(56) References Cited

U.S. PATENT DOCUMENTS

| | | | |
|---|---|---|---|
| 7,929,419 | B2 | 4/2011 | Sprague |
| 8,498,202 | B2 | 7/2013 | Kanode et al. |
| 2001/0039585 | A1 | 11/2001 | Primak et al. |
| 2003/0086410 | A1 | 5/2003 | Eikkula |
| 2004/0088424 | A1 | 5/2004 | Park et al. |
| 2004/0114744 | A1 | 6/2004 | Trossen |
| 2004/0158606 | A1 | 8/2004 | Tsai |
| 2004/0205190 | A1 | 10/2004 | Chong et al. |
| 2004/0221061 | A1 | 11/2004 | Chavez |
| 2005/0207402 | A1 | 9/2005 | Kobayashi et al. |
| 2005/0227685 | A1 | 10/2005 | Costa Requena et al. |
| 2005/0232407 | A1 | 10/2005 | Craig et al. |
| 2006/0010321 | A1 | 1/2006 | Nakamura et al. |
| 2006/0069776 | A1 | 3/2006 | Shim et al. |
| 2006/0101143 | A1 | 5/2006 | Garcia et al. |
| 2006/0104210 | A1* | 5/2006 | Nielsen .................. 370/248 |
| 2006/0253563 | A1 | 11/2006 | Yang et al. |
| 2007/0156909 | A1 | 7/2007 | Osborn et al. |
| 2007/0191004 | A1 | 8/2007 | Yamakawa et al. |
| 2008/0280623 | A1 | 11/2008 | Danne et al. |
| 2009/0040923 | A1* | 2/2009 | Bantukul et al. ............ 370/230 |
| 2009/0185494 | A1 | 7/2009 | Li et al. |
| 2009/0268723 | A1 | 10/2009 | Przybysz |
| 2010/0261490 | A1* | 10/2010 | Berry et al. .................. 455/466 |
| 2012/0079082 | A1* | 3/2012 | Ding et al. .................... 709/220 |

FOREIGN PATENT DOCUMENTS

| | | |
|---|---|---|
| CN | ZL 200780036907 | 2/2012 |
| EP | 0 950 952 A2 | 10/1999 |
| EP | 1 175 074 A2 | 1/2002 |
| JP | 2006-279805 A | 10/2006 |
| KR | 10-2004-0057858 A | 7/2004 |
| KR | 10-2005-0002335 A | 1/2005 |
| KR | 10-2006-0025869 A | 3/2006 |
| WO | WO 00/69140 | 11/2000 |
| WO | WO 01/13228 A2 | 2/2001 |
| WO | WO 2008/019056 A2 | 2/2008 |
| WO | WO 2009/018418 A2 | 2/2009 |
| WO | WO 2011/100629 A2 | 8/2011 |

OTHER PUBLICATIONS

Chinese Office Action for Chinese Patent Application No. 200780036907.1 (Oct. 11, 2010).
Final Official Action for U.S. Appl. No. 11/510,284 (Jun. 22, 2010).
Official Action for U.S. Appl. No. 11/510,284 (Feb. 23, 2010).
Final Official Action for U.S. Appl. No. 11/510,284 (Jul. 9, 2009).
Notification of Transmittal of the International Search Report and the Written Opinion of the International Searching Authority, or the Declaration for International Application No. PCT/US2008/071718 (Jan. 28, 2009).
Official Action for U.S. Appl. No. 11/510,284 (Dec. 24, 2008).
Notification of Transmittal of the International Search Report and the Written Opinion of the International Searching Authority, or the Declaration for International Application No. PCT/US07/17329 (Feb. 15, 2008).
A. B. Roach, "Session Initiation Protocol (SIP)-Specific Event Notification," dynamicsoft, Network Working Group, pp. 1-38 (Jun. 2002).
Rosenberg, "SIP Proxies," www.dynamicsoft.com, pp. 1-30 (Jul. 2000).
Wiesmann et al., "Understanding Replication in Databases and Distributed Systems," IEEE, pp. 464-474 (Apr. 10, 2000).
Wang et al., "A Signaling System Using Lightweight Call Sessions," IEEE, pp. 697-706 (Mar. 26, 2000).
Gribble et al., "The MultiSpace: an Evolutionary Platform for Infrastructural Services," The University of California at Berkeley, pp. 157-170 (Jun. 6, 1999).
Handley et al., "SIP: Session Initiation Protocol," IETF RFC 2543, pp. 1-153 (Mar. 1999).
Handley et al., "SDP: Session Description Protocol," IETF RFC 2327, pp. 1-42 (Apr. 1998).
S. Paul et al., "Reliable Multicast Transport Protocol (RMTP)," IEEE Journal on Selected Areas in Communications, vol. 15, No. 3, pp. 407-421 (Apr. 1997).
Lin et al., "A Reliable Multicast Transport Protocol," IEEE INFOCOM, pp. 1414-1424 (1996).
Notice of Allowance and Fee(s) Due for U.S. Appl. No. 13/026,153 (Apr. 15, 2013).
Communication of European Publication Number and Information on the Application of Article 67(3) EPC for European Patent Application No. 11742923.3 (Nov. 21, 2012).
First Office Action for Chinese Patent Application No. 200820109633.9 (May 3, 2012).
Notification of Transmittal of the International Search Report and the Written Opinion of the International Searching Authority, or the Declaration for International Application No. PCT/US2011/024645 (Oct. 28, 2011).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Tsou et al., "Realm-Based Redirection in Diameter," Internet Engineering Task Force, draft-ietf-dime-realm-based-redirect-02, pp. 1-7 (Oct. 27, 2009).
Extended European Search Report for European Patent Application No. 08796925.9 (Nov. 21, 2014).
Notification of Reexamination for Chinese Patent Application No. 200880109633.9 (Jul. 28, 2014).
Notification of the First Office Action for Chinese Application No. 201180013381.1 (Jun. 5, 2014).
First Examination Report for Indian Patent Application No. 1106/CHENP/2009 (Jan. 28, 2014).
Extended European Search Report for European Application No. 07836478.3 (Nov. 18, 2013).

* cited by examiner

| SUBSCRIBING ENTITY | SUBSCRIBED TO ENTITY | NM EVENT TYPE |
|---|---|---|
| DIAMETER CLIENT / AGENT A | DIAMETER SERVER / AGENT 1 | CONGESTION |
| DIAMETER CLIENT / AGENT A | DIAMETER SERVER / AGENT 1 | FAILURE |
| DIAMETER CLIENT / AGENT B | DIAMETER SERVER / AGENT 1 | FAILURE |

| DIAMETER ENTITY | STATUS |
|---|---|
| DIAMETER SERVER / AGENT 1 | UNAVAILABLE |
| DIAMETER SERVER / AGENT 2 | AVAILABLE |

METHODS, SYSTEMS, AND COMPUTER READABLE MEDIA FOR DISTRIBUTING DIAMETER NETWORK MANAGEMENT INFORMATION

PRIORITY CLAIM

This application claims the benefit of U.S. Provisional Patent Application Ser. No. 61/371,418, filed Aug. 6, 2010, the disclosure of which is incorporated herein by reference in its entirety.

TECHNICAL FIELD

The subject matter described herein relates to Diameter network management. More particularly, the subject matter described herein relates to methods, systems, and computer readable media for distributing Diameter network management information.

BACKGROUND

Diameter nodes may rely on the domain name system (DNS) to obtain contact information for other Diameter nodes. However, DNS does not provide network management or status information regarding Diameter nodes. Rather, DNS simply returns Internet protocol (IP) addresses. As a result, Diameter nodes may use DNS contact information to contact Diameter nodes that are no longer available or congested, resulting in inefficient communications. Another problem associated with Diameter networks in general is there is no mechanism defined for sharing or maintaining Diameter network management information, such as availability, status, or reachability information, among Diameter nodes.

Accordingly, in all of these difficulties, there exists a need for methods, systems, and computer readable media for distributing Diameter network management information.

SUMMARY

Methods, systems, and computer readable media for distributing Diameter network management information are disclosed. According to one method, a first Diameter node obtains Diameter network management subscription information. The first Diameter node obtains Diameter network management information. The first Diameter node determines, using the Diameter network management subscription information, whether at least one second Diameter node is subscribed to receive the obtained Diameter network management information. In response to determining that the at least one second Diameter node is subscribed to receive the obtained network management information, the first Diameter node sends the obtained Diameter network management information to the at least one second Diameter node.

The subject matter described herein can be implemented in software in combination with hardware and/or firmware. In one implementation, the subject matter described herein can be implemented in software executed by a processor. The subject matter described herein can be embodied in a non-transitory computer readable medium having stored thereon executable instructions that when executed by the processor of a computer control the computer to perform steps. Exemplary computer readable media suitable for implementing the subject matter described herein include chip memory devices, disk memory devices, programmable logic devices, and application specific integrated circuits. In addition, a computer readable medium that implements the subject matter described herein can be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, of which.

DETAILED DESCRIPTION

Figure 1A:
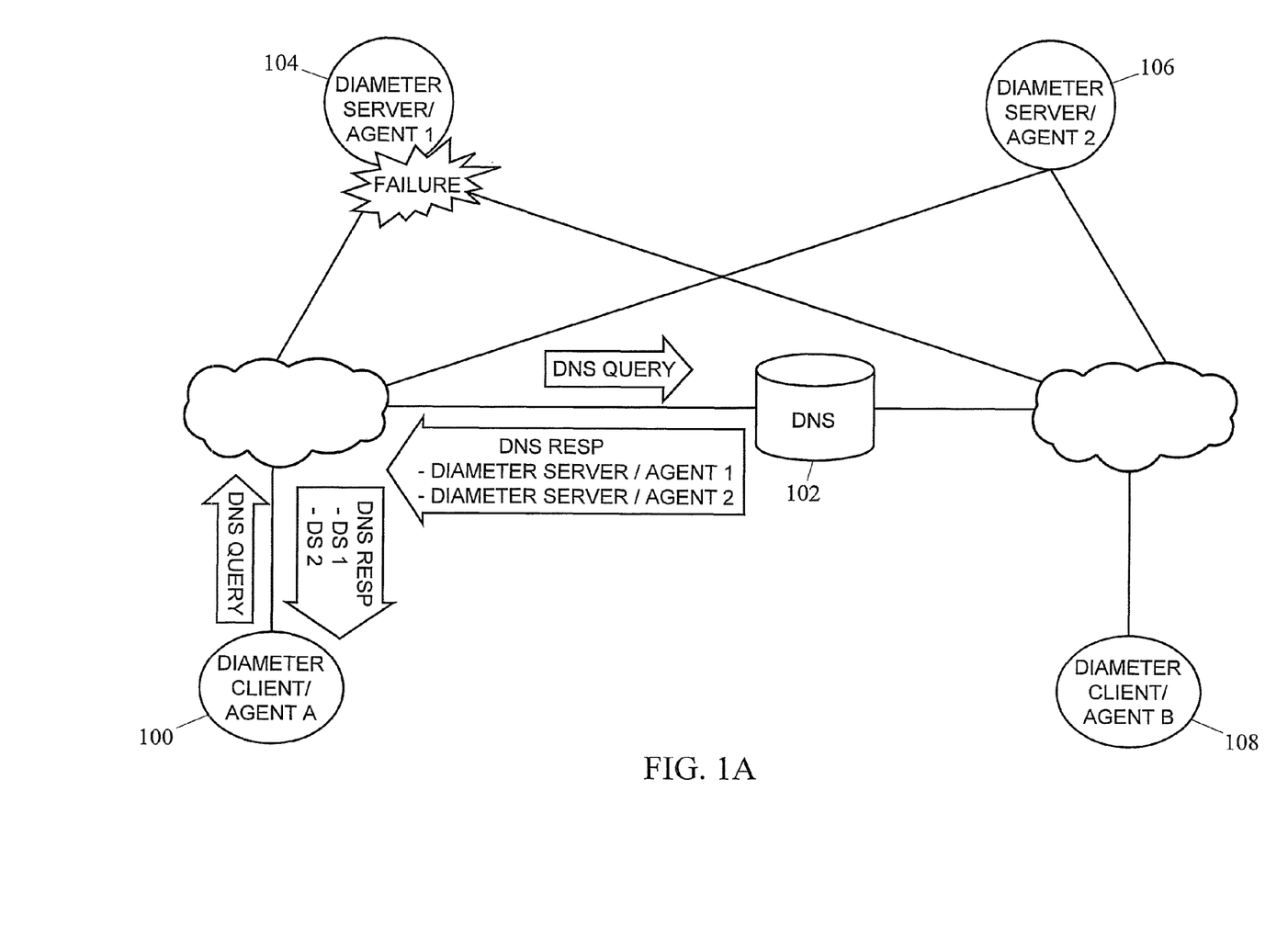
FIG. 1A is a network diagram illustrating a Diameter network where a DNS server returns Diameter address information.

FIG. 1A illustrates a Diameter network where a Diameter agent obtains Diameter contact information from a DNS server. In FIG. 1A, a Diameter node 100 queries a DNS server 102 for contact information for a URI that corresponds to a Diameter service. DNS server 102 responds with IP address information for Diameter node 104 and Diameter node 106, indicating that Diameter node 104 is the preferred agent for providing the requested service. DNS server 102 does not maintain or convey status or availability information associated with either Diameter node 104 or 106. That is, even though in the illustrated example Diameter node 104 is not reachable, DNS server 102 is not aware of this fact.

Figure 1B:
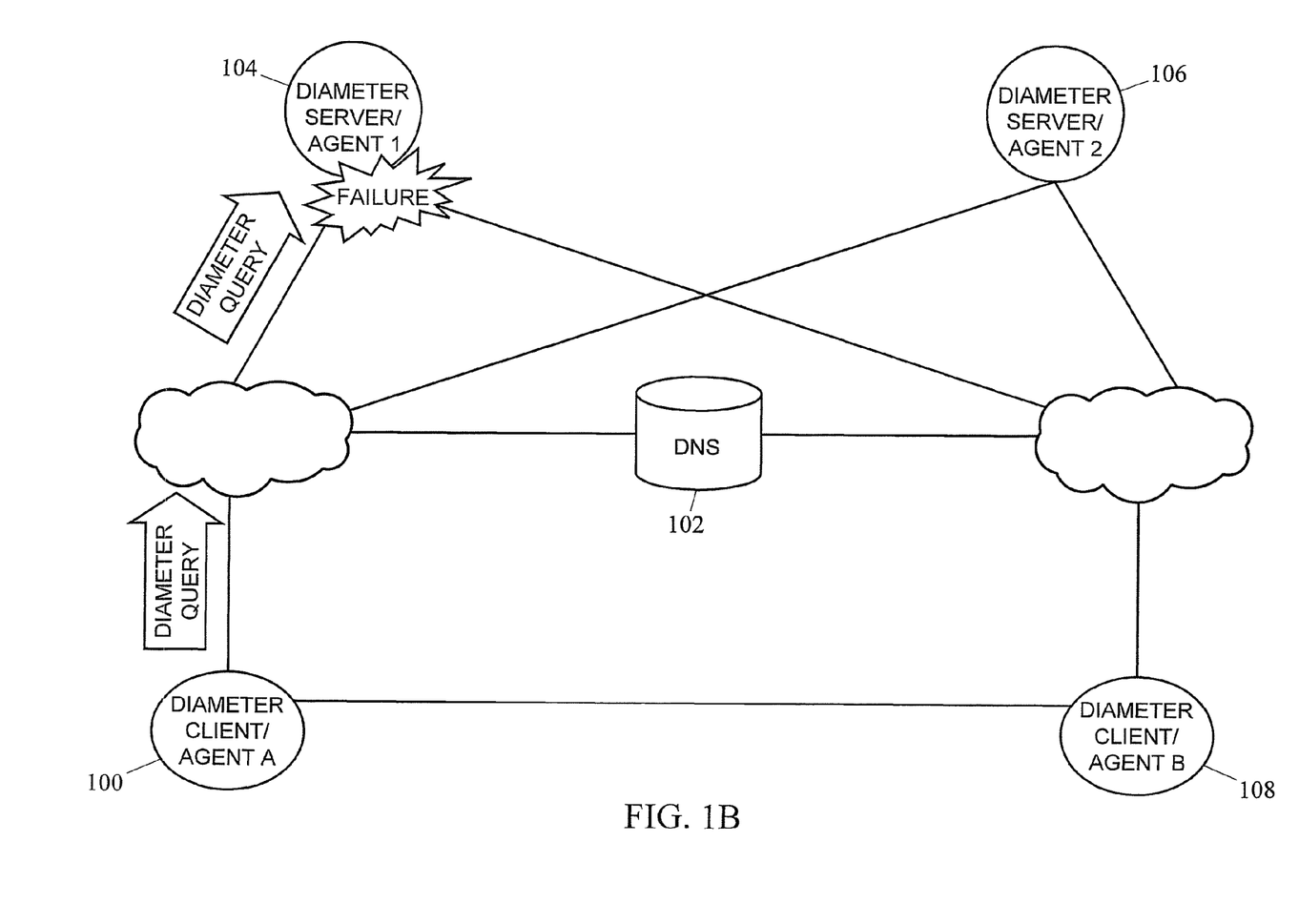
FIG. 1B is a network diagram illustrating a Diameter node learning of the unavailability of another Diameter node.

Referring to FIG. 1B, upon receiving the response from DNS server 102, Diameter node 100 directs a Diameter query to Diameter node 104. Diameter node 100 waits for the response from Diameter node 104. Because Diameter node 104 is unreachable or unavailable due to a failure at Diameter node 104, a timer set by Diameter node 100 may expire. Diameter node 100 may wait for the timer to expire before contacting Diameter node 106. Other Diameter nodes, such as Diameter node 108, may likewise attempt to contact failed Diameter node 104 instead of going directly to Diameter node 106 for a given service.

As used herein, the term "Diameter node" refers to a physical computing platform that hosts one or more Diameter applications. For example, a Diameter node may host a Diameter proxy agent, a Diameter re-direct agent, a Diameter routing agent, such as a Diameter signaling router (DSR), a home subscriber server (HSS), a policy server, such as a policy and charging rules function (PCRF) and/or other type of Diameter agent without departing from the scope of the subject matter described herein. As used herein, the term "Diameter network management information" includes information that conveys the availability or state of Diameter level communications with a Diameter node. Diameter network management information may indicate that the Diameter node is unreachable due to network congestion, overloading of the Diameter application(s), unavailability of the Diameter application(s), etc.

Figure 1C:
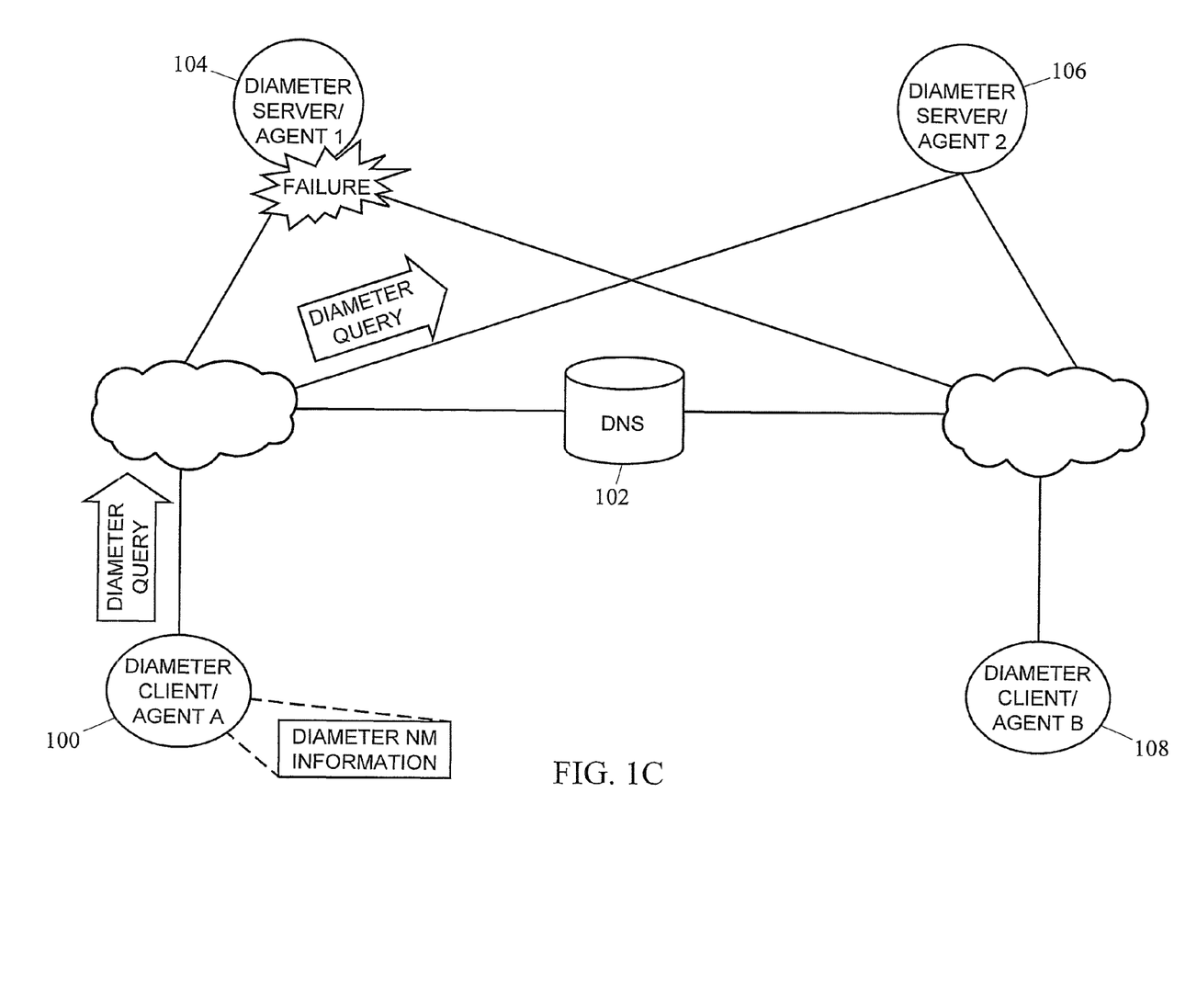
FIG. 1C is a network diagram illustrating the caching of Diameter network management information by a Diameter node according to an embodiment of the subject matter described herein.

To reduce the difficulties associated with Diameter communications and increase the efficiency of Diameter communications, a Diameter node according to the subject matter described herein may cache Diameter network management information and distribute that information to other Diameter nodes that are statically or dynamically subscribed to receive the information. In FIG. 1C, Diameter node 100 may cache Diameter network management information determined as a result of the timeout that occurred when Diameter node 100 failed to receive a response from Diameter node 104. Diameter node 100 may also distribute the Diameter network management information to other Diameter nodes, such as Diameter node 108 using a subscription-based distribution model, which will be described in detail below. After learning the Diameter network management information regarding Diameter node 104, Diameter node 100 may communicate with the available Diameter node 106 to obtain the requested service, rather than repeatedly attempting to contact unavailable node 104, waiting for the timeout, and then attempting to contact Diameter node 106. The selection of Diameter node 106 as the next node to contact for the service may be performed based on DNS preference information received from DNS server 102 or independently of the DNS preference information.

Figure 2:
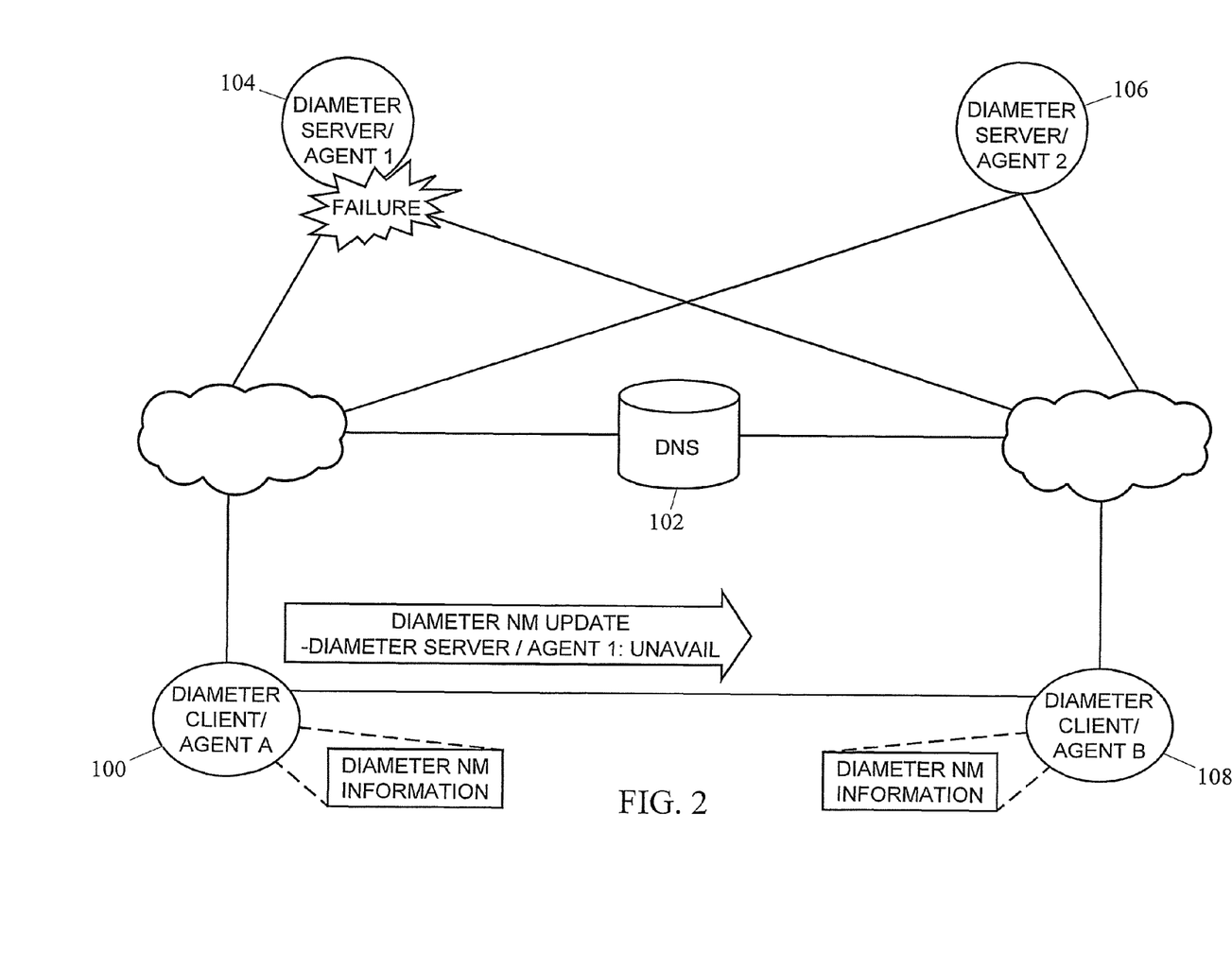
FIG. 2 is a network diagram illustrating the distribution of Diameter network management information among Diameter nodes according to an embodiment of the subject matter described herein.

FIG. 2 illustrates the distribution of Diameter network management information among Diameter nodes. In FIG. 2, Diameter node 100 sends a Diameter network management update message to Diameter node 108. Diameter node 100 may store information indicating that Diameter node 108 has subscribed to receive Diameter network management information regarding Diameter node 104 or 106. Upon receiving the Diameter network management information, Diameter node 108 may also cache the Diameter network management information and use that information to determine which of Diameter nodes 104 and 106 to contact when requesting the service that can be provided by either node.

Figure 3:
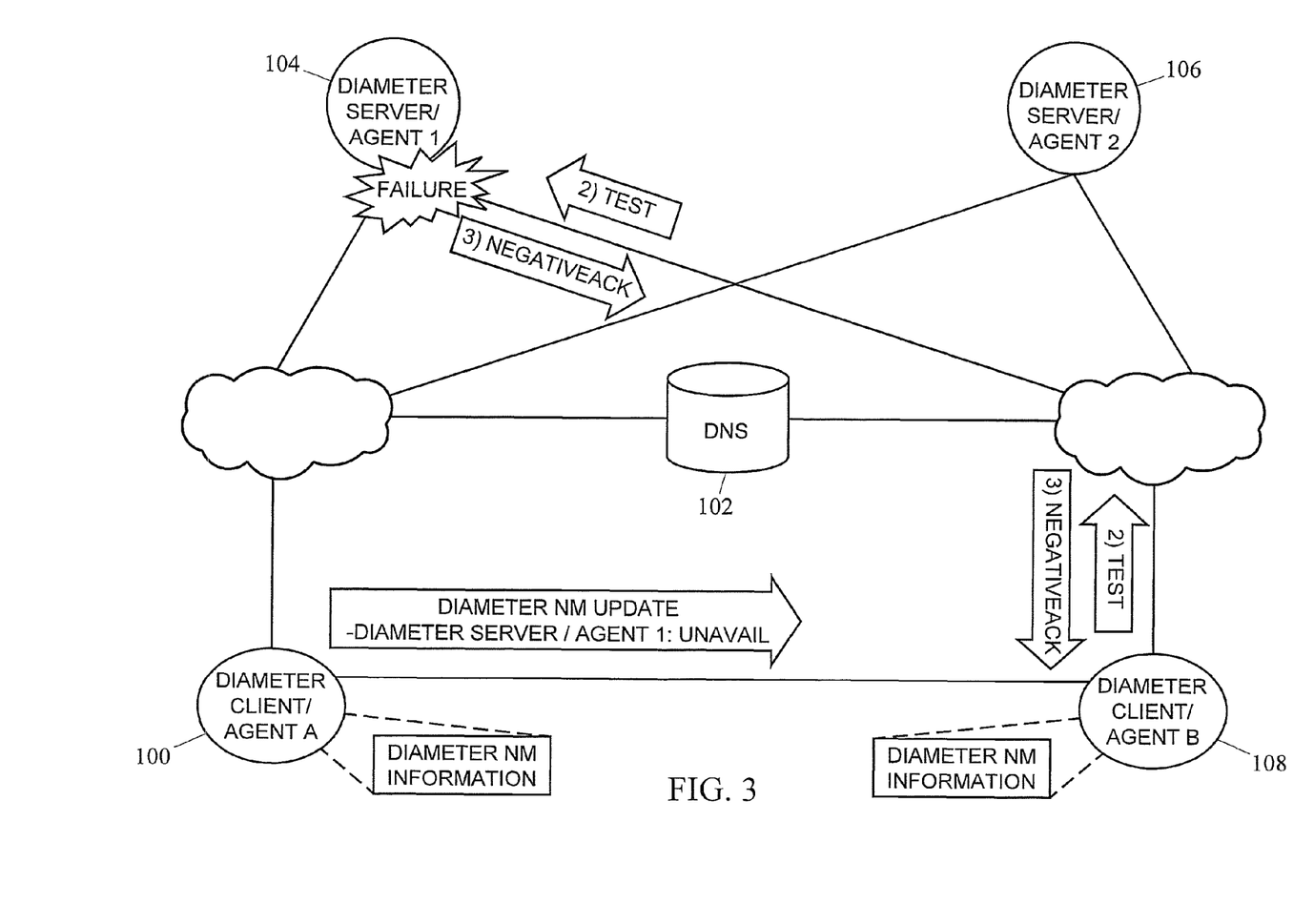
FIG. 3 is a network diagram illustrating the independent testing of a Diameter node for status information according to an embodiment of the subject matter described herein.

FIG. 3 illustrates an example where Diameter node 108 independently tests the status of Diameter node 104 after receiving the Diameter network management information from Diameter node 100. Referring to FIG. 3, Diameter node 108 receives the Diameter network management update message from Diameter node 100. In response to receiving the Diameter network management update message indicating that Diameter node 104 is not available, Diameter node 108 may initiate a test to determine whether the received Diameter network management information is accurate or valid for Diameter node 108. In the illustrated example, Diameter node 108 sends a Diameter network management test message to Diameter node 104. If the test indicates that Diameter node 104 is unavailable, either in response to receiving a negative acknowledgement message or no response to the Diameter network management test message, Diameter node 108 may update its local network management information database to reflect the unavailability of Diameter node 104. If, however, the results of the test indicate that Diameter node 104 is reachable from Diameter node 108, Diameter node 108 may refrain from updating its Diameter network management cache to indicate that Diameter node 104 is unreachable.

Figure 4:
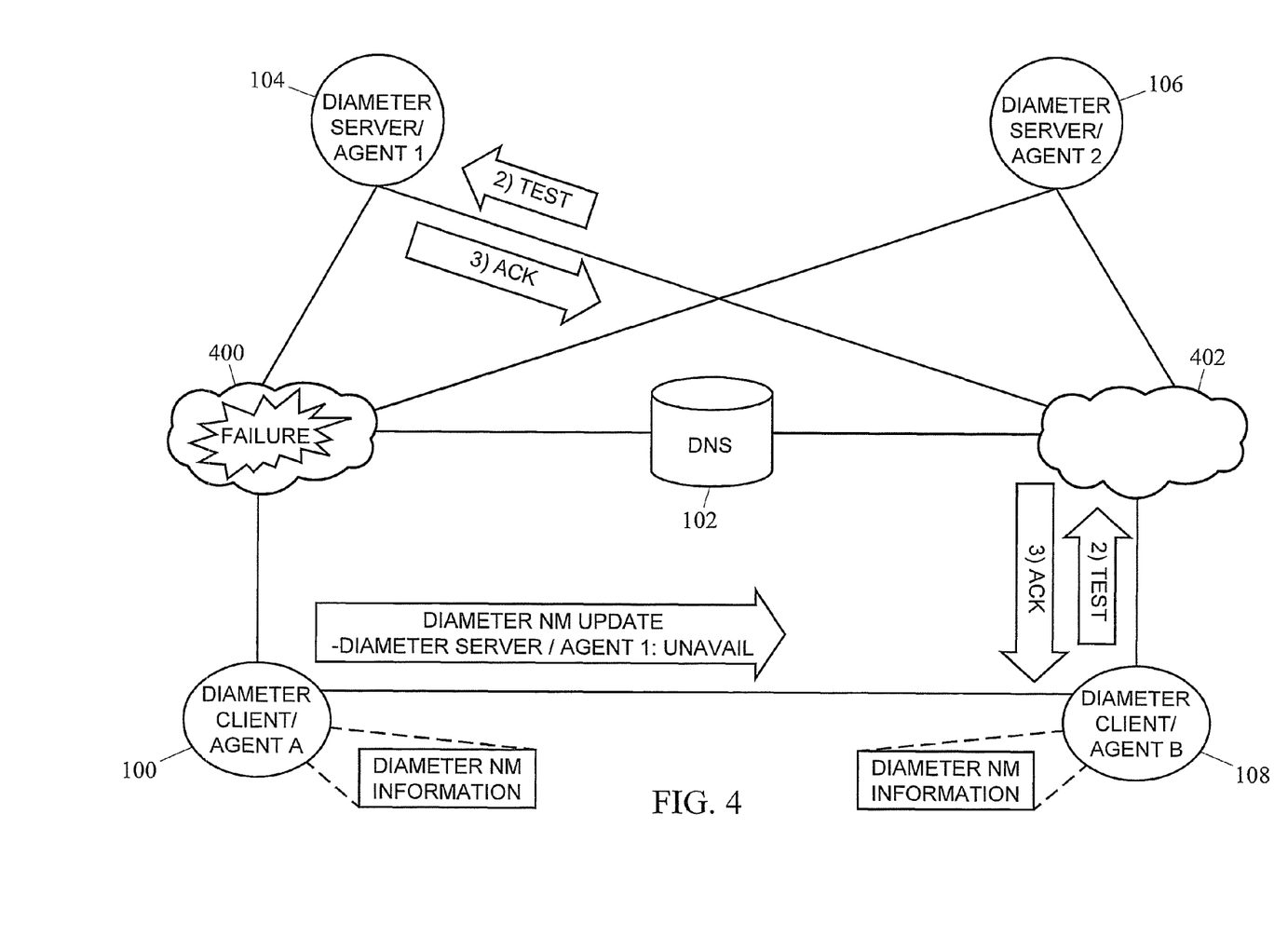
FIG. 4 is a network diagram illustrating the results of a confirmation test by a Diameter node according to an embodiment of the subject matter described herein.

FIG. 4 illustrates an example where the results of the confirmation test in FIG. 3 indicate that Diameter node 104 is available. In FIG. 4, it is the network 400 between Diameter nodes 100 and 104 that causes Diameter node 104 to be unavailable to Diameter node 100. However, network 402 between Diameter node 108 and Diameter node 104 does not have a failure, and Diameter node 104 is reachable to Diameter node 108. The confirmation test that Diameter node 108 performs after receiving the Diameter network management information indicating that Diameter node 104 is unavailable indicates that Diameter node 104 is in fact available to Diameter node 108. As a result, Diameter node 108 may ignore the Diameter network management update message received from Diameter node 100 and continue to send traffic to Diameter node 104.

Figure 5A:
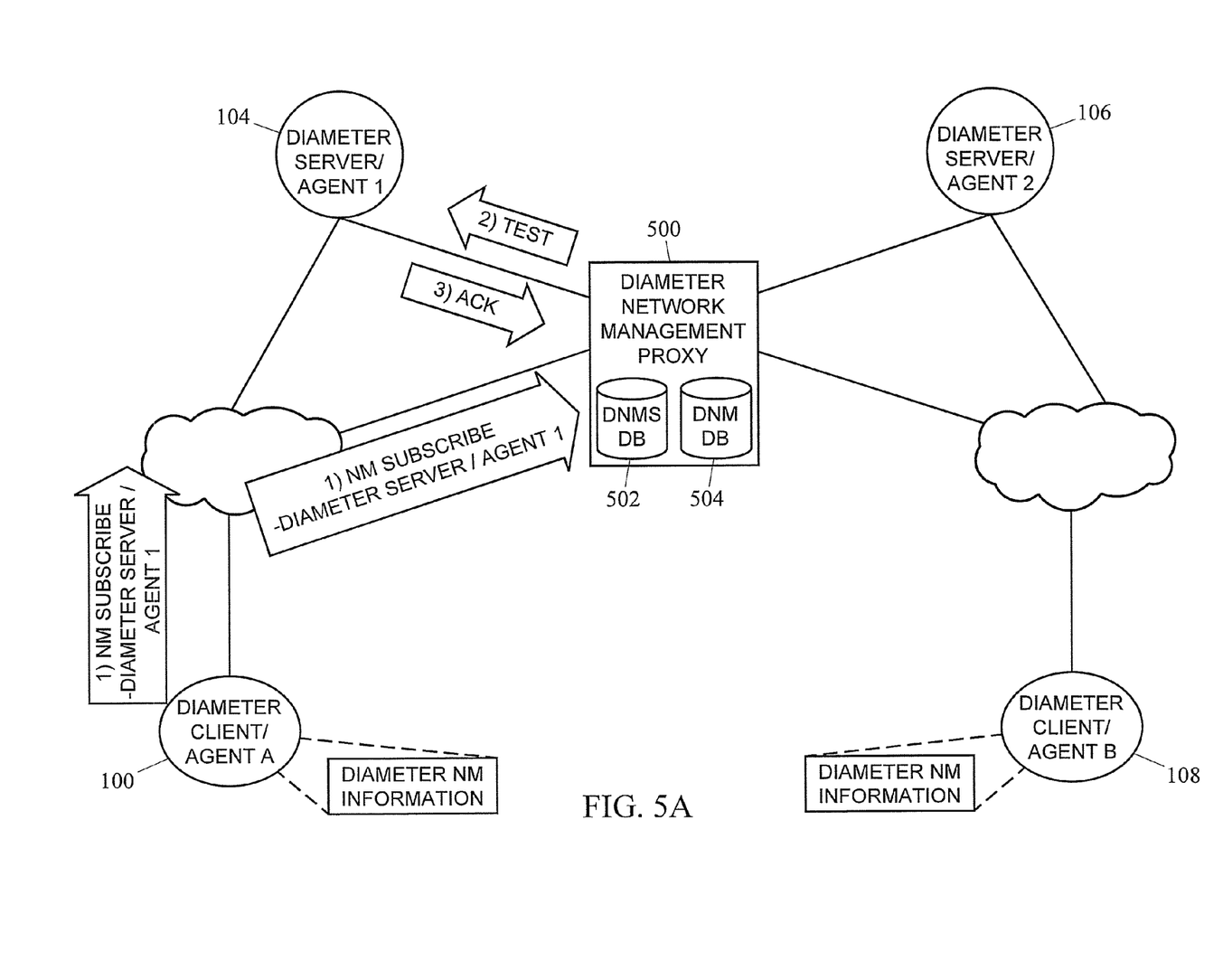
FIG. 5A is a network diagram illustrating a Diameter node that functions as a Diameter network management proxy with which other Diameter nodes subscribed to receive Diameter network management information according to an embodiment of the subject matter described herein.

As indicated above, in one embodiment of the subject matter described herein, Diameter nodes may send subscription messages to a Diameter node to receive network management information concerning other Diameter nodes. FIG. 5A illustrates such an embodiment. In FIG. 5A, Diameter node 102 maintains a Diameter network management subscription (DNMS) database 502 and a Diameter network management (DNM) database 502. Diameter network management subscription database 502 is configured to store information regarding subscribing entities, the entities to which they subscribe, and the types of network management events to which they subscribe. Diameter network management database 504 stores Diameter network management status information regarding other Diameter nodes. In functioning as a Diameter network management proxy, Diameter node 500 may periodically test the status of Diameter nodes to which other Diameter nodes have subscribed by checking the records in Diameter network management subscription database 502 and distribute the network management information to the subscribing nodes.

Figure 5B:
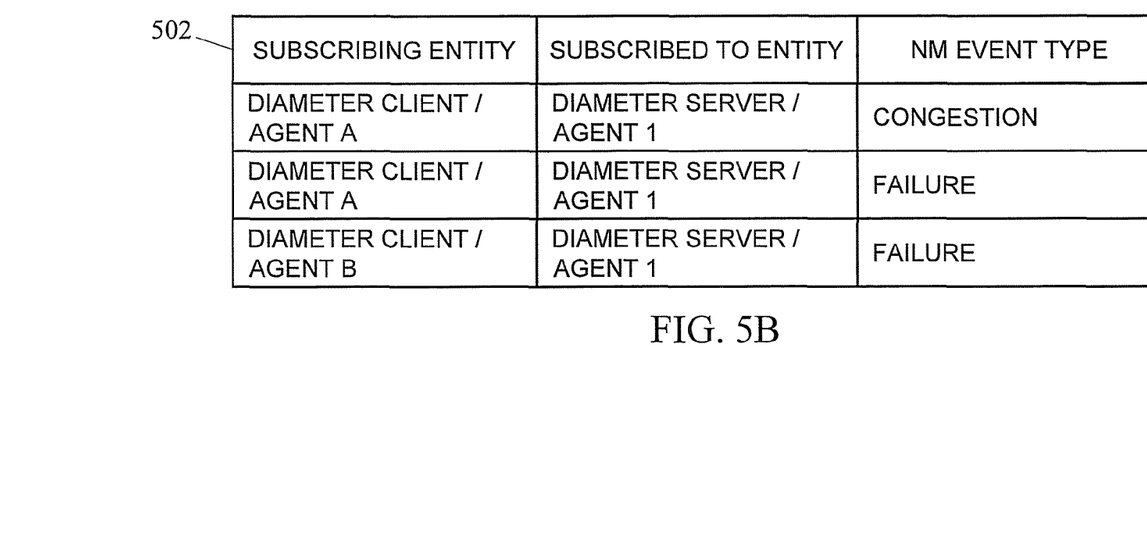
FIG. 5B is a table illustrating exemplary Diameter network management subscription information that may be maintained by a Diameter node according to an embodiment of the subject matter described herein.
Figure 5C:
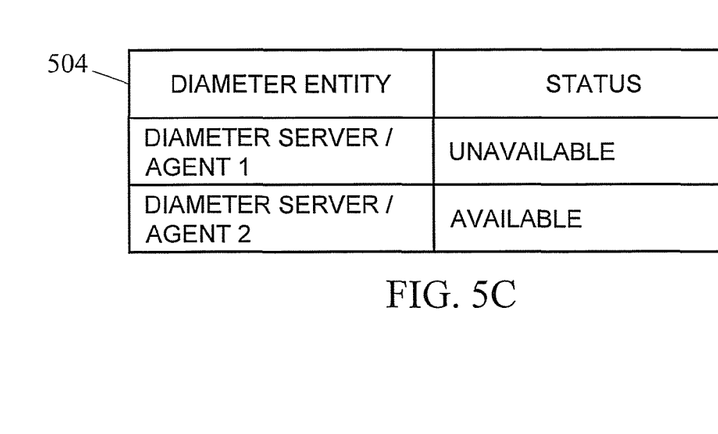
FIG. 5C is a table illustrating exemplary Diameter network management information that may be cached or maintained by a Diameter node according to an embodiment of the subject matter described herein.

In the illustrated example, Diameter node 100 sends a Diameter network management subscribe message to a Diameter node 500 that maintains databases 502 and 504. The subscribe message indicates that Diameter node 100 desires to subscribe to the status of Diameter nodes 104 and 106. In response to receiving the message, Diameter node 500 may store the subscription information in database 502 and may test the status of Diameter nodes 104 and 106. Based on the results of the test, Diameter node 500 may update the Diameter network management information for Diameter nodes 104 and 106 in database 504 and may also communicate the status information to Diameter node 100. FIG. 5B illustrates an example of information that may be stored in database 502. In FIG. 5B, the database includes information regarding each subscribing entity, each subscribed to entity, and the network management event type to which each entity is subscribed. Examples of event types to which entities may subscribe include node failure, application failure, network congestion, node congestion, application congestion, etc. FIG. 5C is a table illustrating exemplary data that may be maintained by database 504. In FIG. 5C, database 504 indicates that Diameter node 104 is unavailable and Diameter node 106 is available.

Figure 5D:
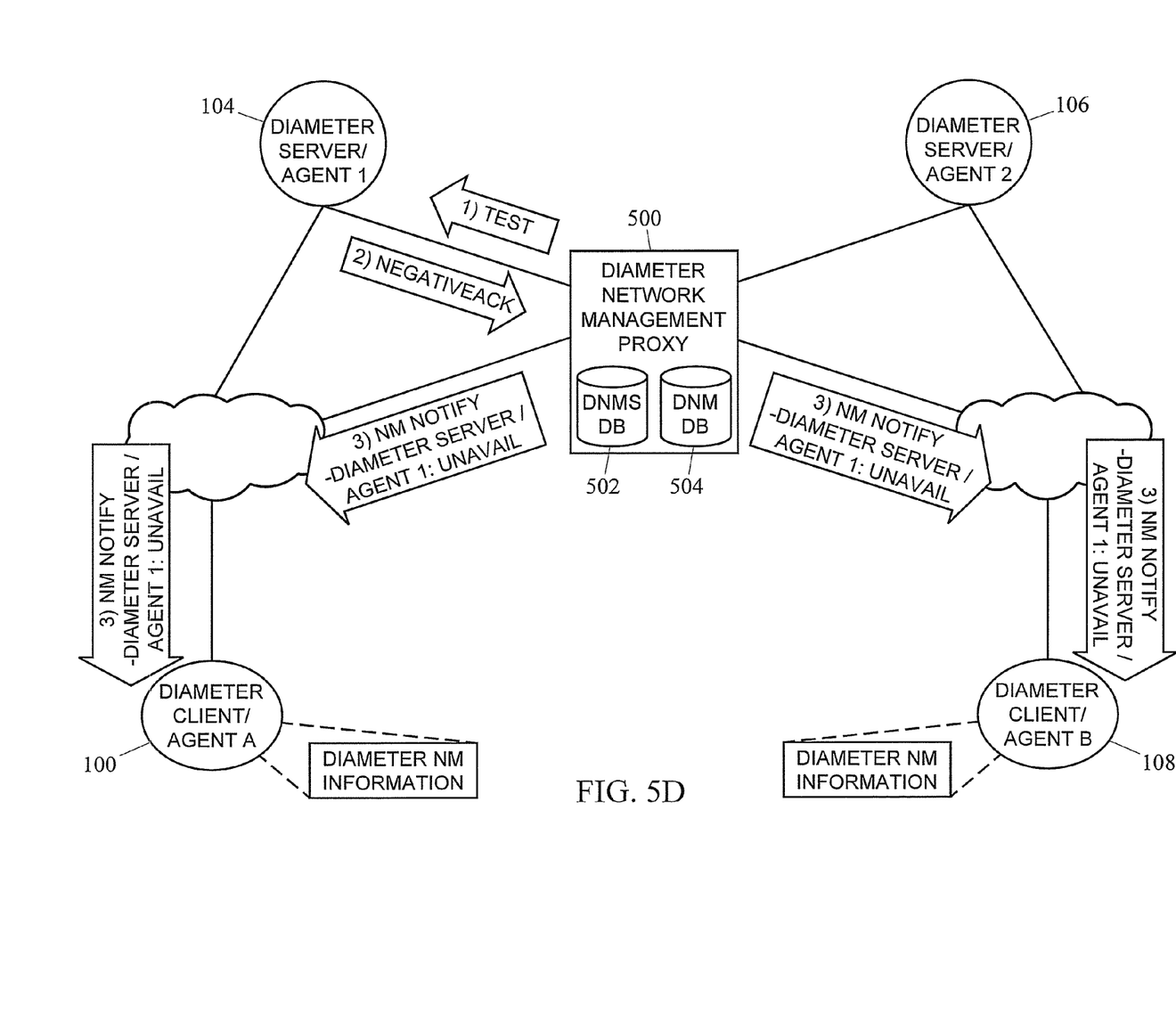
FIG. 5D is a network diagram illustrating the distribution of Diameter network management information to subscribing Diameter nodes according to an embodiment of the subject matter described herein.

In FIG. 5D, using the information stored in database 502 and 504, Diameter node 500 sends Diameter network management information to subscribing entities. In the illustrated example, Diameter nodes 100 and 108 are subscribed to receive network management information concerning Diameter node 104. Accordingly, when Diameter node 500 obtains the Diameter network management information concerning Diameter node 104, Diameter node 500 sends network management notify messages to Diameter nodes 100 and 108. Diameter nodes 100 and 108 use this information to update their local Diameter network management status information caches and further use this information in subsequent communications with Diameter nodes 104 and 106. Diameter nodes 100 and 108 may choose to test the affected Diameter node 104 prior to updating their local Diameter network information databases or caches.

Figure 6:
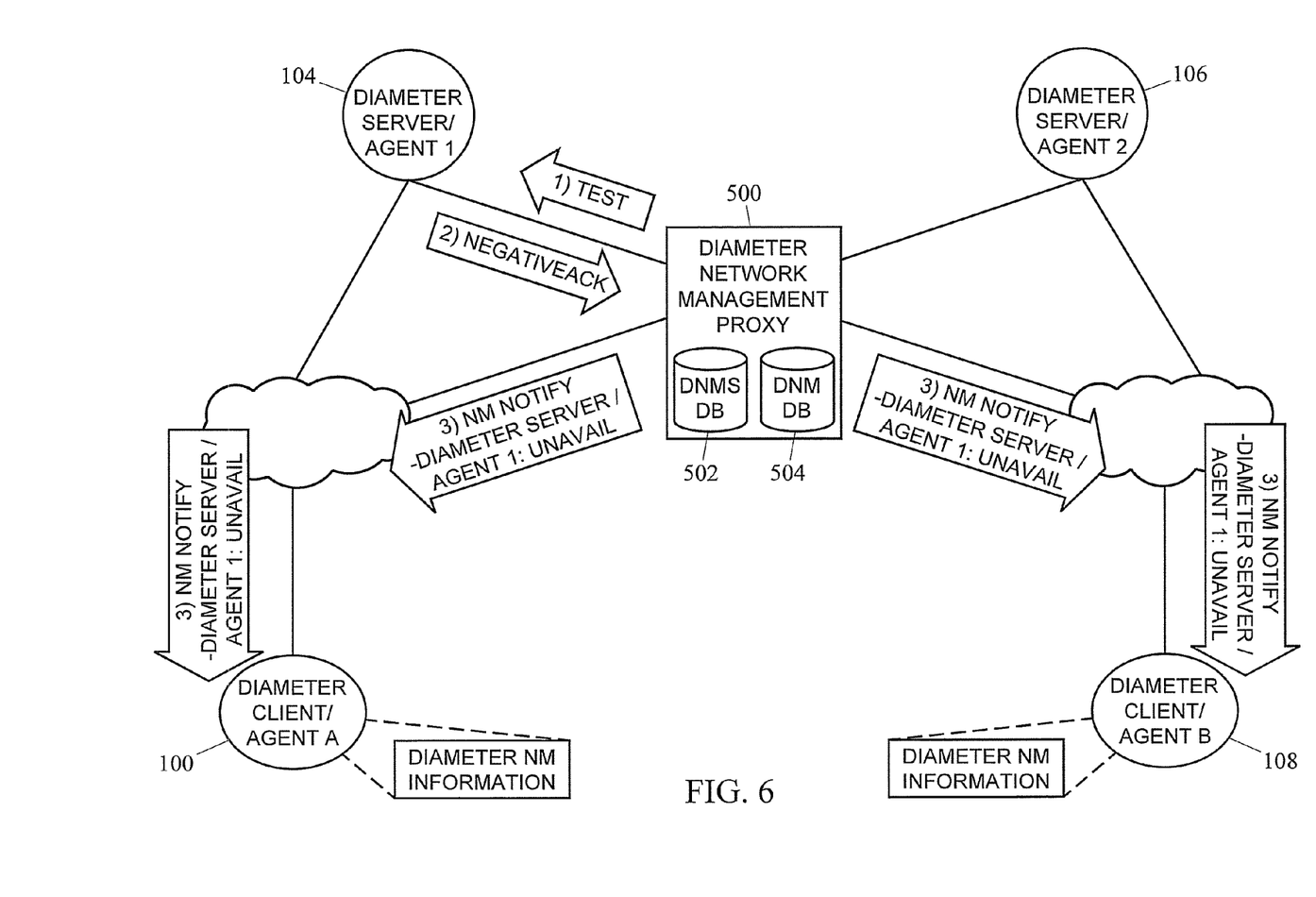
FIG. 6 is a network diagram illustrating the distribution of Diameter network management information to statically subscribed Diameter nodes according to embodiment of the subject matter described herein.

FIG. 6 illustrates an alternate embodiment of the subject matter described herein where Diameter node 500 is statically provisioned with subscription information for nodes that are subscribed to receive Diameter network management information. In the illustrated example, database 502 is statically provisioned to indicate that Diameter nodes 100 and 108 are subscribed to receive network and management information concerning Diameter node 104. As a result, when Diameter node 100 obtains Diameter network management information regarding Diameter node 104, Diameter node 500 will automatically send Diameter network management notify messages to Diameter nodes 100 and 108.

Figure 7:
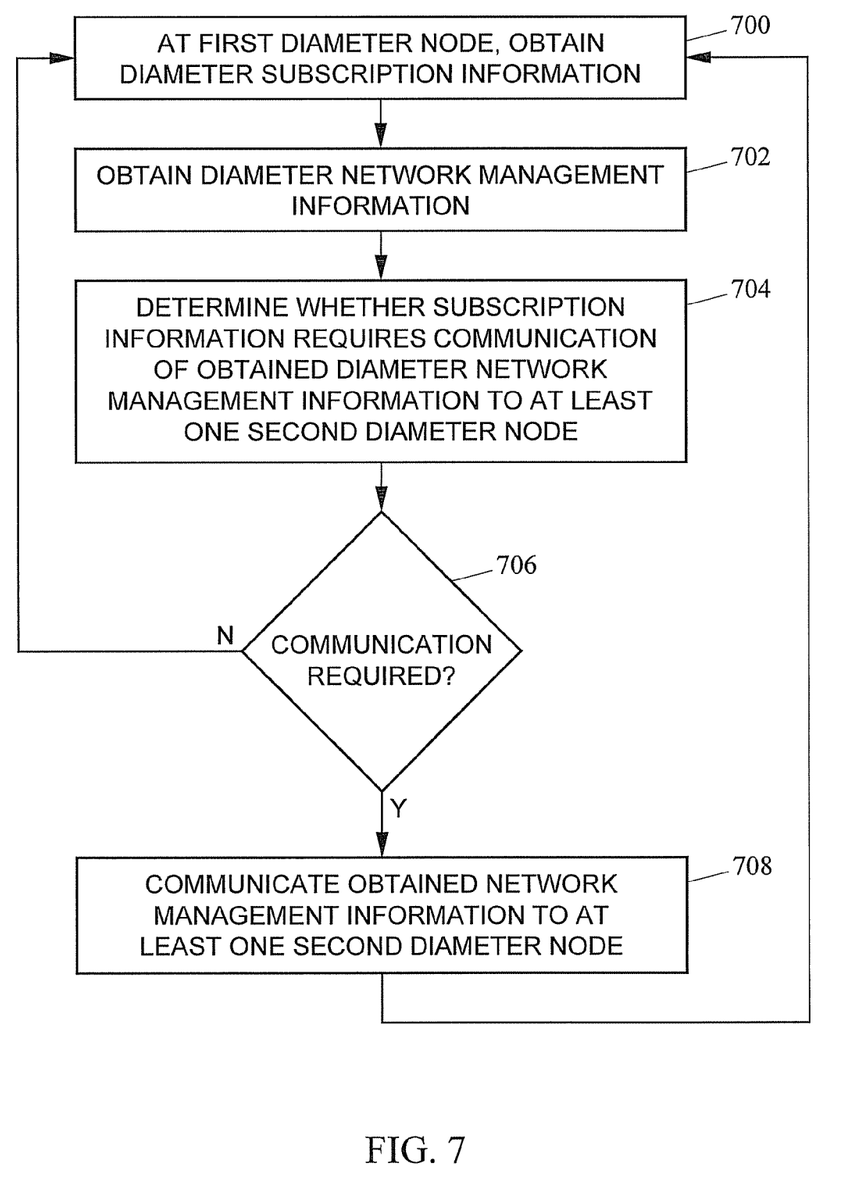
FIG. 7 is a flow chart illustrating an exemplary method for distributing Diameter network management information among Diameter nodes according to an embodiment of the subject matter described herein.

FIG. 7 is a flow chart illustrating exemplary steps for communicating Diameter network information among Diameter nodes according to an embodiment of the subject matter described herein. Referring to FIG. 7, in step 700, a first Diameter node obtains Diameter network management subscription information. For example, referring to FIG. 6, Diameter node 500 may receive a message indicating that Diameter node 100 subscribes to receive Diameter network management information regarding Diameter nodes 104 and 106. Alternatively, Diameter node 500 may be statically provisioned with the subscription information. Returning to FIG. 7, in step 702, Diameter network management information is obtained. For example, referring to FIG. 6, Diameter node 500 may obtain Diameter network management information regarding Diameter node 104 or 106, either through testing or from other Diameter communications independent from testing.

Returning to FIG. 7, in step 704, it is determined whether the Diameter network management subscription information requires communication of the obtained Diameter network management information to at least one second Diameter node. In FIG. 6, Diameter node 500 may access Diameter network management subscription database 502 to determine whether any Diameter nodes are subscribed to receive the indicated network management information.

Returning to FIG. 7, in step 706, if communication of Diameter network management information to at least one second Diameter node is determined to be required, control proceeds to step 708 where the obtained Diameter network management information is communicated to the at least one second Diameter node. Returning to FIG. 6, Diameter node 500 communicates the obtained Diameter network management information to Diameter node 100. The Diameter network management subscription information is checked to determine whether any additional nodes are subscribed to receive the obtained Diameter network management information, and the Diameter network management information is communicated to the remaining subscribing nodes. Returning to FIG. 6, Diameter node 500 may check database 502 and determine that Diameter node 108 is also subscribed to receive the Diameter network management information and may communicate the Diameter network management information to Diameter node 108.

Diameter node 500 may periodically poll nodes to which other nodes are subscribed in database 502 and communicate any received network management information to the subscribing nodes. In FIG. 7, after newly obtained network management information is communicated or not communicated to other Diameter nodes, control returns to step 700 where new Diameter subscription information is obtained and the process is repeated. Steps 702-708 may be repeated periodically, independently of whether any new network management subscription information is received.

Figure 8:
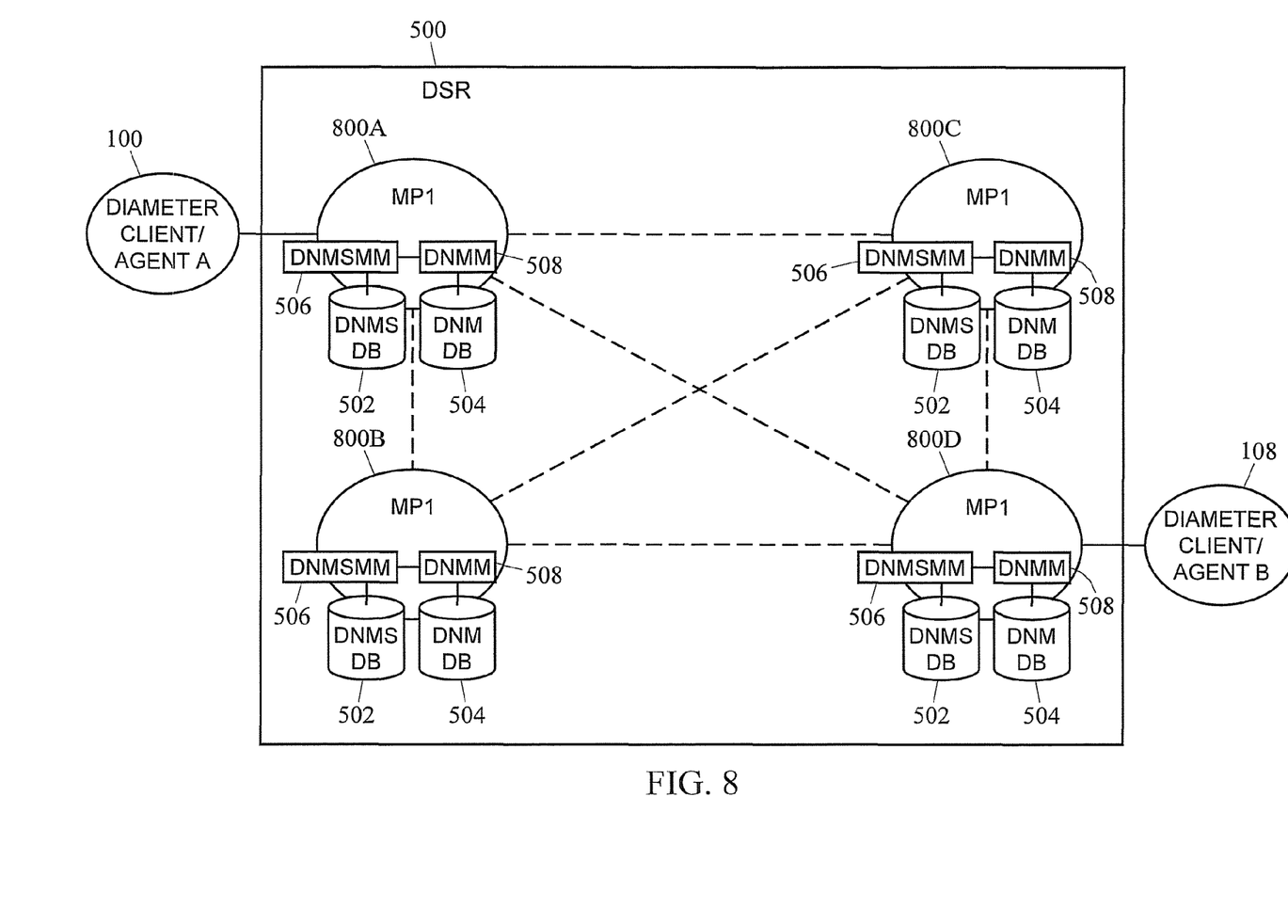
FIG. 8 is a block diagram illustrating an exemplary Diameter node configured to distribute Diameter network management information according to an embodiment of the subject matter described herein.

FIG. 8 is a block diagram illustrating an exemplary internal architecture for a Diameter node that maintains Diameter network management information and Diameter network management subscription information according to an embodiment of the subject matter described herein. Referring to FIG. 8, Diameter node 500 includes a plurality of message processors 800A, 800B, 800C, and 800D. Each Diameter message processor 800A-800D includes or has access to local copies of Diameter network management subscription database 502, Diameter network management database 504, a Diameter network management subscription management module (DNMSMM) 506, and a Diameter network management module (DNMM) 508. Diameter network management subscription management module 506 receives Diameter network management subscription requests, updates the Diameter network management subscription information in database 502, and determines whether obtained Diameter network management information should be communicated to other Diameter nodes using the subscription information stored in database 502. Diameter network management module 506 obtains Diameter network management information and stores the information in database 504. For example, Diameter network management module 506 may test the status of Diameter level communications with other Diameter nodes either periodically or in response to receiving Diameter network management subscription requests, as described above.

Accordingly, when a Diameter message processor receives Diameter network management information, that information may be stored locally in database 504 and communicated to other Diameter message processors. In addition, when a Diameter message processor receives a Diameter network management subscription request, that information may be stored in its local Diameter network management subscription database 502 and communicated to other Diameter message processors for storage in their copies of database 502. When Diameter network management information is received by a Diameter message processor, the Diameter message processor that first receives the network management information may be the Diameter network management processor that provides the Diameter network management information to any subscribing Diameter nodes.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A subscription based method for distributing Diameter network management information, the method comprising:
    at a first Diameter node functioning as a Diameter network management proxy:
        obtaining Diameter network management subscription information;
        obtaining Diameter network management information;
        determining, using the Diameter network management subscription information, whether at least one second Diameter node is subscribed to receive obtained the Diameter network management information; and
        in response to determining that the at least one second Diameter node is subscribed to receive the obtained Diameter network management information, sending the obtained Diameter network management information to the at least one second Diameter node;
    wherein obtaining the Diameter network management information includes testing, by the first Diameter node, a third Diameter node for availability or status of Diameter level communications.

2. The method of claim 1 wherein obtaining the Diameter network management subscription includes receiving a Diameter network management subscription request from the at least one second Diameter node and dynamically populating a Diameter network management subscription database maintained by the first Diameter node using information in the Diameter network management subscription request.

3. The method of claim 1 wherein obtaining the Diameter network management subscription information includes accessing a Diameter network management database in which the Diameter network management subscription information is statically provisioned.

4. The method of claim 1 wherein the first Diameter node comprises a Diameter signaling router (DSR).

5. The method of claim 1 wherein the Diameter network management subscription information specifies a subscribed to entity for which the at least one second Diameter node desires to receive network management information.

6. The method of claim 5 wherein the Diameter network management subscription information specifies a Diameter network management event type for which the at least one second Diameter node desires to be notified.

7. The method of claim 1 wherein the first Diameter node tests the third Diameter node in response to receiving the Diameter network management subscription request from the at least one second Diameter node.

8. The method of claim 1 wherein the first Diameter node tests the third Diameter node periodically and communicates updates to nodes that are subscribed to receive Diameter network management information regarding the third Diameter node.

9. The method of claim 1 wherein the at least one second Diameter node receives the Diameter network management information from the first Diameter node, and, after receiving the Diameter network management information from the first Diameter node and independently of the first Diameter node, tests the status of the third Diameter node to which the Diameter network management information pertains.

10. A subscription-based system for distributing Diameter network management information, the system comprising:
    a first Diameter node functioning as a Diameter network management proxy, the first Diameter node including:
        a Diameter network management subscription management module configured to obtain Diameter network management subscription information;
        a Diameter network management module configured to obtain Diameter network management information;
        wherein the Diameter network management subscription management module is configured to determine, using the network management subscription information, whether the at least one second Diameter node is subscribed to receive the obtained Diameter network management information;
        wherein the Diameter network management module is configured to, in response to a determination that the second Diameter node is subscribed to receive the obtained Diameter network management information, send the obtained Diameter network management information to the at least one second Diameter node; and
        wherein the first Diameter node is configured to test a third Diameter node for Diameter level communications availability or status.

11. The system of claim 10 wherein the Diameter network management subscription management module is configured to receive a Diameter network management subscription request from the at least one second Diameter node and to dynamically populate a Diameter network management subscription database maintained by the first Diameter node using information in the Diameter network management subscription request.

12. The system of claim 10 wherein the Diameter network management subscription management module is configured to access a Diameter network management subscription database in which the Diameter network management subscription information is statically provisioned.

13. The system of claim 10 wherein the first Diameter node comprises a Diameter signaling router (DSR).

14. The system of claim 10 wherein the Diameter subscription information specifies a subscribed to entity for which the at least one second Diameter node desires to receive network management information.

15. The system of claim 14 wherein the Diameter network management subscription information specifies a Diameter network management event type for which the at least one second Diameter node desires to be notified.

16. The system of claim 10 wherein the first Diameter node is configured to test the third Diameter node in response to receiving the Diameter network management subscription request from the at least one second Diameter node.

17. The system of claim 10 wherein the first Diameter node is configured to test the third Diameter node periodically and to communicate updates to nodes that are subscribed to receive Diameter network management information regarding the third Diameter node.

18. A non-transitory computer readable medium having stored thereon executable instructions that when executed by the processor of a computer control the computer to perform steps comprising:
    at a first Diameter node functioning as a Diameter network management proxy:
        obtaining Diameter network management subscription information;

obtaining Diameter network management information;
determining, using the Diameter network management subscription information, whether at least one second Diameter node is subscribed to receive the obtained Diameter network management information; and
in response to determining that the at least one second Diameter node is subscribed to receive the obtained Diameter network management information, sending the obtained Diameter network management information to the at least one second Diameter node;
wherein obtaining the Diameter network management information includes testing, by the first Diameter node, a third Diameter node for availability or status of Diameter level communications.

* * * * *